United States Patent [19]

Tsai et al.

[11] Patent Number: 4,946,701
[45] Date of Patent: Aug. 7, 1990

[54] BEVERAGES

[75] Inventors: Chee-Hway Tsai, West Chester; David C. Heckert, Oxford; James T. Kuznicki, Cincinnati, all of Ohio

[73] Assignee: Procter & Gamble, Cincinnati, Ohio

[21] Appl. No.: 389,442

[22] Filed: Aug. 4, 1989

[51] Int. Cl.$^5$ .............................................. A23F 3/00
[52] U.S. Cl. ..................................... 426/597; 426/590
[58] Field of Search ............... 426/597, 435, 591, 442, 426/477, 590

[56] References Cited

U.S. PATENT DOCUMENTS

| | | | |
|---|---|---|---|
| 2,235,700 | 3/1941 | Eldred | 426/477 |
| 3,531,296 | 9/1970 | Smithies | 426/435 |
| 3,911,145 | 10/1975 | Marion | 426/597 |
| 3,950,553 | 4/1976 | Gasser | 426/435 |
| 4,004,038 | 1/1977 | Wickremasinghe | 426/435 |
| 4,076,856 | 2/1978 | Zeitlin et al. | 426/594 |
| 4,167,589 | 9/1979 | Vitzthum | 426/386 |
| 4,552,769 | 11/1985 | Lunder | 426/435 |
| 4,680,193 | 7/1987 | Lunder | 426/597 |
| 4,851,252 | 7/1989 | Greither | 426/597 |

FOREIGN PATENT DOCUMENTS

| | | | |
|---|---|---|---|
| 688856 | 6/1964 | Canada | 426/435 |
| 0201000 | 11/1986 | European Pat. Off. | |
| 2586532 | 9/1985 | France | |
| 51-13681 | 7/1976 | Japan | |
| 60-13780 | 1/1985 | Japan | 426/597 |
| 1510583 | 3/1976 | United Kingdom | |

OTHER PUBLICATIONS

J. Sci. Fd Agric., 1975, 26, 1439–1459, "The Nutritional and Therapeutic Value of Tea–A Review", Geoffrey V. Stagg and David J. Millin.
Hypertension, 6 (3), 437–444, 1984, "Reduction of Chronic Psychosocial Hypertension in Mice by Decaffeinated Tea", James P. Henry, M.D., Ph.D and Patricia Stephens-Larson.
Advances in Food Research, 24, 1978, pp. 269–271.

Primary Examiner—Carolyn Paden
Attorney, Agent, or Firm—R. A. Dabek; J. J. Yetter; R. C. Witte

[57] ABSTRACT

A beverage containing a flavorant and green tea solids or flavanols is disclosed. The beverage can contain sweeteners. Caffeine can also be present in the beverage in ratio of caffeine to flavanols of from about 1:1 to about 1:30. The beverage can be carbonated or non-carbonated, i.e. a still beverage such as fruit juice or coffee. The preferred green tea solids are catechin and epicatechin and their derivatives. When caffeine is present, this beverage retains the alertness benefit of caffeine along with the relaxing effects attributed to the green tea solids.

29 Claims, No Drawings

BEVERAGES

TECHNICAL FIELD

A beverage containing green tea solids or flavanols is disclosed. Caffeine can also be in the beverage. The beverage can be carbonated or noncarbonated.

BACKGROUND OF THE INVENTION

Teas, both green and black teas, contain caffeine, but the caffeine in these drinks does not appear to be as physiologically available as in coffee. In fact, green tea is believed to have a relaxing benefit owing to the flavanols (i.e., the catechins and epicatechins) present in green tea.

Green tea has had several physiological benefits attributed to it. It is believed to lower blood pressure and to have other soothing and healing benefits. It is believed that the flavanols are responsible for these benefits. These flavanols readily polymerize when green tea is converted to black tea; therefore, black tea contains very low amounts of catechins, epicatechin and their derivatives.

Black tea is considered to be a stimulating beverage. This is probably due to its higher levels of caffeine in relation to the unpolymerized flavanols.

The effect of mixtures of these catechins and epicatechin with caffeine on the stimulatory effect of caffeine has been shown in French patent No. 2,586,532 issued to Glenshard, et al (1987) in which an extract of cola was studied. This extract was prepared and studied in a dry state since cola extracts are not stable in a liquid state. Laboratory animals were fed this extract and their activity studied. When caffeine and catechin or epicatechin mixtures were fed to the animals, caffeine was said to have a delayed reaction time, i.e. activity of the animals was slower to start than when caffeine alone was fed to the animals. The stimulating effect of caffeine was also more controlled and longer lasting when caffeine was administered in the form of this cola extract. Ratios of caffeine to catechins in the range of 8:1 to 1:2.5 are disclosed. The cola extract had to be administered and kept in a dry state. This is a disadvantage of the cola extract.

Another way to control the stimulatory effect of caffeine and related methylxanthines has been through the use of pyridines and related pyridine compounds. The preferred beverages for the addition of these pyridines are tea, coffee, cocoa, and colas. See for example UK patent No. 1,510,583 (1978) and U.S. Pat. No. 4,076,856 (1978).

While the beneficial effects of green tea solids and of the flavanols are suggested by the literature, the use of these materials in beverages other than green tea or cola and the specific combination of these catechins with caffeine in a stable form in beverages is not known.

Therefore, it is an object of this invention to provide a beverage, which provides the beneficial effects of flavanols and which is stable in liquid form.

It is another object of this invention to provide a beverage which contains caffeine and which provides the alertness benefit of caffeine along with the beneficial effects of the flavanols or green tea solids.

These and other objects will become apparent from the description herein.

All percentages are by weight unless otherwise indicated.

DETAILED DESCRIPTION OF THE INVENTION

A beverage comprising:
(a) water;
(b) at least 0.5% natural or botanical flavor; and
(c) a mixture of flavanols selected from the group consisting of catechin, catechin derivatives, epicatechin, epicatechin derivatives and mixtures thereof.

Preferably this beverage contains a sweetener.

A beverage containing caffeine in a ratio of caffeine to flavanols of about 1:1 to about 1:30 is also disclosed. The beverage can be carbonated or non-carbonated.

DEFINITIONS

As used herein, the term "beverage" refers to a beverage composition which is in a single strength, ready-to-serve drinkable form or is a concentrate which can be diluted with water or carbonated water to form a drinkable beverage. Beverages of the present invention typically comprise at least 40% water when in a concentrated form and at least 80% water, preferably at least 85% water when in a single strength form. Sugar sweetened beverage concentrates typically comprise between 25% to 75%, and preferably from 40% to 60% water. Concentrates are usually formulated to provide a single strength drinkable beverage when diluted with two to four parts by weight water. Beverages include fruit flavored drinks, 100% fruit juices, dilute fruit juices, soft drinks, carbonated drinks, and coffees, including flavored coffees, and iced black tea or flavored black tea drinks.

As used herein, the term "beverage syrup" refers to a beverage concentrate which further comprises sugar. Beverage syrups typically comprise from 30% to about 70% by weight sugar. Beverage syrups are diluted to form beverage concentrates and beverage drinks.

As used herein, the term "comprising" means various components can be conJointly employed in the beverages and beverage concentrates in the present invention. Accordingly, the term "comprising" encompasses the more restrictive terms "consisting essentially of" and "consisting of".

As used herein, the term "sweetener" is a material which provides a sweet flavor. Sweetener includes added materials as well as those sweeteners that are naturally present as in fruit juices. Examples of sweeteners include sugars which are mono and di-saccharide carbohydrates, artificial sweeteners, sugar alcohols, and other naturally sweet compounds.

As used herein, the term "carbonated" means that the beverage contains both dissolved and dispersed carbon dioxide.

As used herein, the term "flavorant" means a natural or synthetic fruit flavor, botanical flavor, and mixtures thereof. Fruit flavors are derived from the edible reproductive part of a seed plant, especially sweet pulp associated with the seed. Botanical flavor refers to flavors derived from other parts of a plant other than its fruit, e.g., roots or leaves. Fruit juice is a natural flavorant.

As used herein "flavanols" or "catechins" means primarily catechin, epicatechins, and their derivatives. These derivatives include the sugar salts, sugar esters, and other edible physiologically available derivatives. Green tea solids contain these catechins.

In making a single strength beverage, a beverage concentrate or beverage syrup is usually formed first.

This beverage concentrate typically contains an emulsifier and water soluble flavors, emulsion stabilizing agents and weighting agents, if needed, and any color and/or suitable preservatives. After the concentrate is formed, sugar and water are added to make a beverage syrup. This beverage syrup is then mixed with an appropriate quantity of water or carbonated water to form a finished beverage or beverage concentrate. The weight ratio of water:syrup is from about 2:1(3X syrup) to about 4:1(5X syrup).

FLAVANOLS

The catechins and epicatechins, are also known as flavanols components. These flavanols are obtained by the extraction of plants, e.g. green tea and related plants. Plants containing catechins are known to those skilled in the art. The flavanols can be extracted from either a single plant or mixtures of plants. Examples of the most common flavanols which are obtained from extraction from the tea plants and other members of the catechu gambir or (Uncaria family) are catechin, epicatechin, gallocatechin, epigallocatechin, epicatechin gallate, epigallocatechin gallate. Any mixture of two or more of the flavanols can be used in the process of this invention. Catechin is preferably used in combination with one of the other flavanols mentioned above. The flavanols can be extracted from green tea or other natural source by any suitable method well known to those skilled in the art. For example, extraction with ethyl acetate or chlorinated solvents is one way to isolate flavanols or catechins; or, they may be prepared by synthetic or other appropriate chemical methods. Flavanols, including catechin, epicatechin, and their derivatives are commercially available.

These flavanols are natural substances present in a variety of plants including green teas and herb teas. For a completely natural drink, green tea solids and green tea catechins are preferred.

Green tea includes materials obtained from the tea plant *Camellia sinensis*, for instance, freshly gathered tea leaves, fresh green tea leaves that are dried immediately after gathering, fresh green tea leaves that have been heat treated before drying to inactivate any enzymes present, and aqueous extracts of these leaves. Green tea materials are tea leaves and their extracts which have not undergone substantial fermentation to create black tea.

The amount of catechins or flavanols in the beverage can vary. However, at least about 0.02% is used and from about 0.05% to about 1.0% is preferred. Most preferably, from about 0.05% to about 0.1% is used in a single strength product. For the concentrates or syrups, higher levels will be used. Preferably, from about 0.05% to about 4.0% is used in a syrup or concentrate.

The ratio of caffeine to flavanols in the beverage should be from about 1:1 to about 1:30. Preferably the range will be from about 1:1 to 1:10, and most preferably from about 1:2 to about 1:5.

The particular ratio of catechin to epicatechin is not important. What is important is the total caffeine to total flavanols ratio.

THE CARBONATED WATER COMPONENT

Carbon dioxide can be introduced into the water which is mixed with the beverage syrup or into the dilute beverage to achieve carbonation. The carbonated beverage is usually placed into a container such as a bottle or can and then sealed. Any conventional carbonation methodology can be used to make the carbonated beverages of this invention.

The amount of carbon dioxide in the beverage will depend upon the particular flavor system used and the amount of carbonation desired. Usually, carbonated beverages of the present invention contain from 1.0 to 4.5 volumes of carbon dioxide. The preferred carbonated beverages contain from 2 to about 3.5 volumes of carbon dioxide.

SWEETENERS

Beverages and beverage syrups of the present invention contain a sweetener. The sweeteners typically used are carbohydrates or sugars. As used herein, the term "sugar" refers to mono- and di-saccharide sweeteners. Examples of such sugars include sucrose, glucose, fructose, high fructose corn syrup, invert syrup, refiners syrup, corn syrup, maltose and high maltose syrups and mixtures thereof. Preferred sugars are sucrose and high fructose corn syrup.

Sugars, especially high fructose corn syrup, provide body to the beverage which enhances its textural preference.

Sugar alcohols can also be used in the beverages of the present invention. These sugar alcohols include sorbitol, mannitol, and xylitol. Usually, however, these materials are not used as the sole sweetener because in the levels required to sweeten beverages, they have a side effect of flatulence or related gastrointestinal related problems.

For diet beverages, non-caloric sweeteners can be used. Examples of such sweeteners include aspartame, saccharine, cyclamates, acetosulfam, L-aspartyl-L-phenylalanine lower alkyl ester sweeteners, L-aspartyl-D-alanine amides as disclosed in U.S. Pat. No. 4,411,925 to Brennan, et al (1983), L-aspartyl-D-serine amides disclosed in U.S. Pat. No. 4,399,163 to Brennan et al (1983), L-aspartyl-hydroxymethylalkane amide sweeteners disclosed in U.S. Pat. No. 4,338,346 issued to Brand (1982), L-aspartyl-1-hydroxyethylalkane amide sweeteners disclosed in U.S. Pat. No. 4,423,029 to Rizzi (1983), glyccherins, synthetic alkoxy aromatics, etc.

The amount of sweetener effective in the beverages of the present invention depends upon the particular sweeteners used and the sweetness intensity desired. For non-caloric sweeteners this amount varies depending upon the sweetness intensity of the particular sweetener. The amount for artificial sweeteners generally ranges from about 0.01% to about 0.1%.

Another way of measuring the amount of sweetener is to base it upon the sweetness compared lo sucrose. For Carbohydrates or sugars, the amount of sweetener can be from about 1% to about 14%, and preferably from 6% to about 14% by weight for single strength beverages. Preferred single strength beverages contain from 9% to about 13% by weight sugar.

Mixtures of low calorie or artificial sweeteners sugars can also be used in the present invention, i.e., a mixture of aspartame and sucrose or high fructose corn syrup can be used. This provides a reduced calorie beverage.

For beverage syrups of the present invention, the amount of sugar used is significantly higher. Usually, the amount of sugar in a beverage syrup is from 30% to 70% by weight. Preferably, such beverage syrups contain from 40% to 60% by weight sugar.

FLAVOR COMPONENT

The flavor component of the beverages and beverage concentrates and syrups of the present invention is a natural or artificial flavor selected from fruit flavors, botanical flavors and mixtures thereof. Fruit flavors refers to those flavors derived from the edible reproductive part of the seed plant, especially one having a sweet pulp associated with the seed, for example, apples, oranges, lemon, limes, etc. Also included within the term fruit flavor are synthetically prepared flavors made to simulate fruit flavors derived from natural sources. Particularly preferred fruit flavors are the citrus flavors including orange, lemon, lime and grapefruit flavors. A variety of other fruit flavors can be used such as apple, grape, cherry, pineapple, coconut and the like. These fruit flavors can be derived from natural sources such as fruit juices and flavor oils or synthetically prepared. If desired, fruit juices, including orange, lemon, lime, apple and grape can be used in a flavor component.

As used herein, the term botanical flavor refers to flavors derived from parts of the plant other than the fruit. As such, botanical flavors can include those flavors derived from nuts, bark, roots and leaves. Also included within this term are synthetically prepared flavors made to simulate botanical flavors derived from natural sources. Examples of botanical flavors include cola flavors, tea flavors, coffee and the like. These botanical flavors can be derived from natural sources such as essential oils and extracts or be synthetically prepared. Coffee, black tea, and herbal tea extracts can be used as the flavorant herein.

The flavor component can comprise a single flavor or blended flavors. For example, lime and lemon flavors, cola flavors with citrus flavors to form a "cola" and pineapple and orange flavors are preferred flavor blends.

The flavors in the flavor component are sometimes formed into an emulsion, which is then dispersed into the beverage concentrate. Emulsion droplets usually have a specific gravity less than that of the water and therefore can form a separate phase. Weighting agents, which can also act as clouding agents, are typically used to keep the emulsion droplets dispersed in the beverage. Examples of such weighting agents are brominated vegetable oils, rosin esters and, in particular, ester gums. Any weighting agent that is commercially available can be used in this invention. Besides weighting agents, emulsifiers and emulsion stabilizers can be used to stabilize the flavor emulsion droplets. Examples of such emulsifiers and emulsion stabilizer include gums, pectins, cellulose, polysorbates, sorbitan esters and propylene glycol alginates.

The particular amount of the flavor component effective for imparting flavor characteristics to the beverages and beverage concentrates of the present invention will depend upon the flavor, the flavor impression and formula flavor component. For flavor components which are substantially free of fruit juice, that is, which are not 100% fruit juice, the flavor component can comprise at least 0.05% by weight of the beverage composition and typically from 0.1% to about 2% by weight of the beverage (on a single strength basis). When fruit juices are used, the flavor component can comprise, on a single strength basis, up to 20% fruit juice by weight of the beverage, preferably from 5% to 15% fruit juice by weight for either carbonated or non-carbonated beverages. Fruit juices contain about 12% sweetener or sugar solids, but the majority of the juice is water. Juice beverages can also contain up to 60% juice as the primary flavorant.

Coffee beverages can also be used in the present invention. Regular or decaffeinated coffees including flavored coffees can be blended with the catechins. Flavored coffes included spiced coffees, orange, chocolate, toffee, mocha, cream and other flavored coffees. Black teas, flavored teas, and herbal teas can also be used herein. These include lemon, apple and orange flavored teas, cinnamon, spice, mint, rose, hibiscus and chamomile teas.

pH AND OTHER BEVERAGE INGREDIENTS

The pH of the beverages and beverage concentrates in syrups of the present invention is dependent upon the particular composition of the acid component, the total amount of acids used and the sourness impression desired. Typically, the pH can range from 2.5 to about 5. Preferred carbonated beverages have a pH of from about 2.5 to about 4.0.

The pH of the beverage is controlled by the addition of edible acids, as well as organic edible acids. A particularly preferred inorganic acid component is phosphoric acid, particularly for cola-type flavor beverages. Phosphoric acid can be present in its undissociated form, or as an alkali metal salt, for example, potassium or sodium hydrogen phosphate, potassium or sodium dihydrogen phosphate salts.

Edible organic acids which can be used include citric acid, malic acid, fumaric acid, adipic acid, gluconic acid, tartaric acid, ascorbic acid, acetic acid, or mixtures thereof. These acids can be present in their undissociated form or else as their respective salts.

CAFFEINE COMPONENTS

The caffeine can be added separately or as a component of the flavor system. Kola, cocoa nuts, coffee and teas contain caffeine. These materials can be part of the beverage, but the caffeine present in them should be factored into the percentage of caffeine in the solution. Purified caffeine obtained from the extraction of coffee or synthetically produced caffeine can also be used.

The amount of caffeine is from about 0.002% to about 0.05% by weight of the single strength beverage. Preferably, the amount of caffeine is from about 0.002% to about 0.02%. For the concentrates or syrups the caffeine level will be from about 0.006% to about 0.15%. Caffeine levels can be higher if flavored coffees which have not been decaffeinated are used since these materials contain caffeine naturally.

ADDITIONAL INGREDIENTS

The flavanols can add a bitter taste to foods and beverages. This is particularly notable in beverages which are not ordinarily astringent or bitter. This bitter taste can be modified by adding polysaccharides including cellulose, pectin, and various gums to the beverage. These materials form a reversible complex with the flavanols and mask the bitterness, but release the flavanols in the stomach or intestines for absorption.

Nucleotides and nucleic acids, as well as other alkaloids can also be used to control the bitterness.

STABILITY

One of the problems with flavanols is their stability in liquids. Catechins tend to form polymeric materials.

The beverages herein are stable for more than 3 months at room temperature.

This stability is shown whether or not caffeine is present in the beverage.

EXAMPLE 1

Commercial green tea leaves are extracted with water counter-currently using a series of five Mr. Coffee ® automatic brewers. From 900 g of dry leaves and 13.5 l of water, 2000 ml of tea concentrate containing 10% solids is obtained. The concentrate is evaporated to about half of its volume in a vacuum rotary evaporator at 60° C. and under 30 mm Hg pressure, and freeze-dried subsequently to tea powder. About 200 g of dry green tea solids is obtained.

Green tea solids (200 g) is dissolved in 2000 ml of warm water and is mixed thoroughly with 3000 ml of methylene chloride/ethanol mixture (4/1, v/v) in a 6 liter separatory funnel. The mixture is allowed to separate into two layers. The organic layer (bottom) is drained out. To the aqueous layer 3000 ml of ethyl acetate is added and mixed thoroughly. After separation into two layers, the organic layer (top) is collected. The ethyl acetate extraction is repeated two more times and three fractions of ethyl acetate are combined. The solvent is removed in a vacuum rotary evaporator at 40° C. under 30 mm Hg pressure. The dry residues are dissolved in 200 ml distilled water, evaporated to 100 ml at 60° C. under 30 mm Hg pressure, and freeze-dried. About 33 g of dry green tea solids is obtained and it contains nearly 100% catechins based on HPLC (high pressure liquid chromatography) and the vanillin analysis (described below).

Vanillin Analysis

The vanillin method is more specific for catechins because the vanillin reagent reacts only with the hydroxyl groups on the phloroglucinol unit (A ring) of catechin. It can be used to measure the content of catechins and the degree of polymerization.

Material and Method

Reaqents

Vanillin reagent: 1.0 g vanillin is dissolved in 100 ml of 70% sulfuric acid (v/v). Prepare fresh every three days.

Standard epicatechin solution: Prepare fresh epicatechin stock solution at 1.0 mg/ml in 50% ethanol.

Dilute epicatechin standard to 0.05, 0.10, 0.20, 0.30 mg/ml from the stock solution with distilled water. Dissolve samples in 50% ethanol at the following concentrations: Green tea solids—0.4–0.6 mg/ml; green tea catechins 0.1–0.2 mg/ml. The sample or standard solution (0.25 ml) is mixed with 0.75 ml of distilled water in a test tube. Add 4.0 ml of vanillin reagent to the test tube which has been placed in iced water to keep the temperature below 35° C. The sample and reagent are mixed well and cooled. This mixture is incubated at room temperature for 15 minutes. Read absorbance at 500 nm using (1.0 ml distilled water+4.0 ml vanillin reagent) as a blank in an absorption spectrophotometer.

Do not allow more than 0.1 ml of alcohol in the reaction because alcohol appears to change the intensity of the red color complex.

Epigallocatechin and epicatechin gallate appear to have the same molar absorptivity as epicatechin when complexed with vanillin under acidic conditions. Therefore, a molecular weight ratio of 1.5 is used to convert the molar absorption into the weight of flavanol solids in an epicatechin standard.

The precision of vanillin assay is determined to be 1.3% cv based on three separate runs of standard epicatechin.

EXAMPLE 2

As described in Example 1, 2000 ml of 10% tea concentrate is obtained from the counter-current extraction. It is mixed with 3000 ml of methylene chloride/ethanol mixture (4/1, v/v), and extracted three times with 3000 ml of ethyl acetate. The process produces 37 g of dry catechins.

EXAMPLE 3

A beverage syrup is made by mixing the following ingredients:

| Ingredient | Weight |
|---|---|
| Distilled Water | 9,444.5 grams |
| Phosphoric Acid (75%) | 49.6 grams |
| Citric Acid | 7.55 grams |
| Cola Flavor | 186.2 grams |
| Liquid Fructose (77% by weight solids) | 8,482.8 grams |
| Sucrose | 725.8 grams |
| Caffeine | 8.695 grams |
| *Green tea solids | 152.6 grams |

*The purified green tea solids contain 4.3% caffeine and 95.7% catechins.

This syrup is mixed with carbonated water to prepare a carbonated cola beverage (117.3 grams of syrup is diluted with 353.5 grams of carbonated water at a level of 3.2 to 3.4 volumes of carbon dioxide). The level of caffeine is about 0.02%.

EXAMPLE 4

When the beverage of Example 3 is stored at various temperatures, the catechin levels remained essentially the same after 12 weeks:

| | % Total Catechins Remained | | |
|---|---|---|---|
| | 34° F. (1.1° C.) | 70° F. (21.1° C.) | 80° F. (26.7° C.) |
| HPLC assay | 95% | 86% | 86% |
| Vanillin assay | 95% | 99% | 100% |

EXAMPLE 5

| Ingredients | Amount |
|---|---|
| Decaffeinated Instant Tea | 3.5 grams |
| Orange Juice Flavor | 0.5 grams |
| Orange Juice Duramone (flavor) | 0.5 grams |
| Green Tea solids from example 1 | 3.5 grams |
| Equal ® (tablets) | 0.5 grams* |
| Frozen Concentrated Tangerine Juice | 35 grams |
| Water | 1356.50 grams |

*Equal ® is an artificial sweetener comprising aspartame and a bulking agent.

This beverage is served both hot and cold and tastes refreshing.

EXAMPLE 6

| Ingredients | Amount |
|---|---|
| Raspberry Fruit Tea | 7 grams |
| Cranberry/Raspberry Cocktail (Frozen Concentrate) | 35 grams |

| Ingredients | Amount |
| --- | --- |
| Water | 1,360 grams |
| Green Tea Solids from Example I | 3.5 grams |

The tea is extracted using hot water to make a brewed tea. The juice concentrate is added prior to serving. This product is served both hot and cold.

A similar beverage is prepared using cranberry/raspberry frozen cocktail, raspberry cocktail concentrate, orange juice concentrate, pineapple concentrate, and other juices. When these beverages are consumed, the alertness benefit of the caffeine present in the green tea solids is evident, but the side effects often associated with caffeine are not present.

What is claimed is:

1. A beverage comprising:
   (a) at least 80% by weight of water;
   (b) at least about 0.05% flavanols selected from the group consisting of catechin, catechin derivatives, epicatechin, epicatechin derivatives and mixtures thereof; and
   (c) an effective amount of flavorant.

2. A beverage according to claim 1 wherein said beverage further contains from 1% to about 14% by weight of a sweetener.

3. A beverage according to claim 2 wherein said sweetener is selected from the group consisting of sucrose, fructose, dextrose, high fructose corn syrup, high maltose syrup, sugar naturally present in fruit juice and mixtures thereof.

4. A beverage according to claim 3 wherein said flavorant is selected from the group consisting of fruit flavor, botanical flavor and mixtures thereof.

5. A beverage according to claim 1 wherein said flavorant is selected from the group consisting of coffee, black tea, herbal tea, fruit flavors and from about 2% to about 60% fruit juice.

6. A beverage according to claim 5 wherein said flavanols are green tea solids or are derived from other natural sources.

7. A beverage according to claim 4 wherein said sweetener from about 0.05% by weight to about 1% by weight of an artificial sweetener.

8. A beverage according to claim 2 wherein said water is carbonated water with from 1.0 to about 4.5 volumes of carbon dioxide.

9. A carbonated beverage according to claim 4 wherein said flavanols are derived from green tea solids or other natural source.

10. A carbonated beverage according to claim 9 wherein said sweetener comprises from about 0.05% by weight to about 1% by weight.

11. A beverage syrup or concentrate consisting of:
    (a) at least 25% by weight of water;
    (b) at least 0.05% flavanols selected from the group consisting of catechin, catechin derivatives, epicatechin, epicatechin derivatives and mixtures thereof, and
    (c) an effective amount of flavorant.

12. A beverage syrup or concentrate according to claim 11 further comprising from 30% to about 70% by weight of a sweetener and wherein said sweetener is selected from the group of carbohydrates.

13. A beverage syrup or concentrate according to claim 12 wherein said sweetener is selected from the group consisting of sucrose, fructose, dextrose, high fructose corn syrup, high maltose syrup and mixtures thereof.

14. A beverage syrup or concentrate according to claim 13 wherein said flavorant comprises a member selected from the group consisting of botanical flavors and mixtures thereof.

15. A beverage syrup or concentrate according to claim 11 wherein said flavorant is coffee, black tea, herbal tea or cola.

16. A beverage syrup or concentrate according to claim 12 wherein said sweetener comprises from about 0.05% by weight to about 1% by weight of an artificial sweetener.

17. A beverage syrup or concentrate according to claim 11 wherein said flavanols are derived from green tea solids or other natural source.

18. A beverage concentrate according to claim 11 consisting of:
    (a) at least 40% by weight of water;
    (b) from about 0.05% to about 4.0% of flavanols selected from the group consisting of catechin, catechin derivatives, epicatechin, epicatechin derivatives and mixtures thereof;
    (c) from about 0.002% to about 1.0% caffeine, the ratio of caffeine to flavanols being at least about 1:1;
    (d) an effective amount of sweetener; and
    (e) an effective amount of flavorant.

19. A beverage concentrate according to claim 18 wherein said sweetener is from 30% to about 70% by weight of the concentrate and is selected from the group of carbohydrates.

20. A beverage concentrate according to claim 19 wherein said sweetener is selected from the group consisting of sucrose, fructose, dextrose, high fructose corn syrup, high maltose syrup and mixtures thereof.

21. A beverage concentrate according to claim 20 wherein said flavorant is selected from the group consisting of fruit flavor, botanical flavor and mixtures thereof.

22. A beverage concentrate according to claim 21 wherein said flavorant is selected from the group consisting of fruit juice, coffee or black tea or herbal tea.

23. A beverage concentrate according to claim 18 wherein said sweetener is an artificial sweetener and is present in an amount of from about 0.05% by weight to about 1% by weight.

24. A beverage concentrate according to claim 23 wherein said flavanols are derived from green tea solids or other natural source.

25. A beverage concentrate according to claim 19 wherein said flavanols are derived from green tea solids or other natural source.

26. A beverage comprising:
    (a) at least 80% by weight water;
    (b) at least about 0.05% flavanols selected from the group consisting of catechin, catechin derivatives, epicatechin, epicatechin derivatives and mixtures thereof;
    (c) an effective amount of a flavorant; and
    (d) a bitterness masking agent selected from the group consisting of cellulose, pectins, gums, nucleotides and nucleic acids.

27. A carbonated beverage according to claim 26 wherein said water is carbonated water with from 1.0 to about 4.5 volumes of carbon dioxide and which further contains from 1% to about 14% by weight of a sweetener.

28. A beverage according to claim 6 wherein said flavor is
   selected from the group consisting of flavored teas, coffee, decaffeinated coffee and flavored coffees.

29. A beverage concentrate according to claim 24 selected
   from the group consisting of flavored teas, coffee, decaffeinated coffee and flavored coffees.

* * * * *